Figure 1:
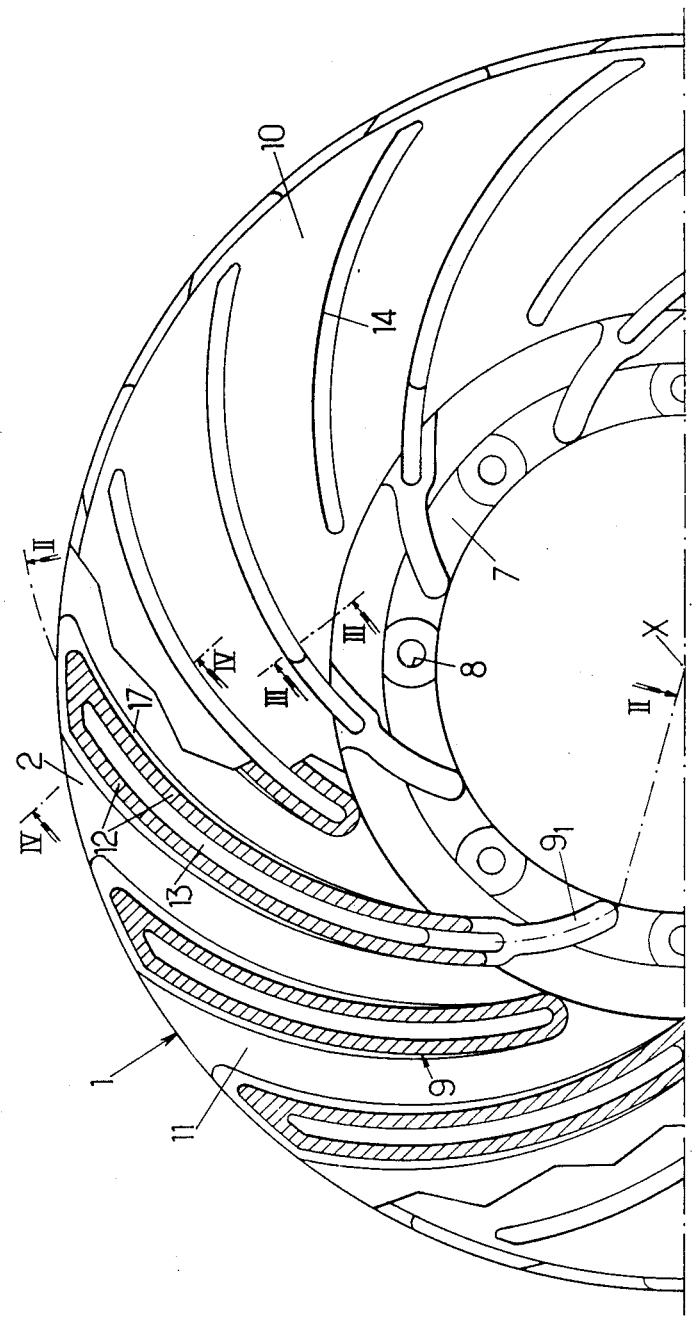

United States Patent [19]

Marandet

[11] Patent Number: 4,982,127

[45] Date of Patent: Jan. 1, 1991

[54] ARMATURE ROTORS FOR ELECTROMAGNETIC RETARDERS

[75] Inventor: André Marandet, Saint-Gratien, France

[73] Assignee: Labavia - S.G.E., Bois d'Arcy, France

[21] Appl. No.: 844,594

[22] Filed: Mar. 27, 1986

[30] Foreign Application Priority Data

Apr. 15, 1985 [FR] France .................. 85 05609

[51] Int. Cl.$^5$ ............... H02K 49/04; F16D 65/27
[52] U.S. Cl. ................... 310/105; 188/264 AA; 416/186 R
[58] Field of Search ............ 310/92, 93, 103, 105, 310/208; 188/264 A, 264 AA; 416/186 R

[56] References Cited

U.S. PATENT DOCUMENTS

| | | |
|---|---|---|
| 1,137,939 | 5/1915 | Wern . |
| 2,068,820 | 1/1937 | Sarazin et al. . |
| 2,345,016 | 3/1944 | Tack . |
| 2,473,040 | 6/1949 | Schlegel, Jr. .............. 188/264 |
| 2,656,021 | 10/1953 | Butler ........................ 188/251 |
| 2,685,659 | 8/1954 | Bessiere ..................... 310/93 |
| 2,728,421 | 12/1955 | Butler ........................ 188/218 |
| 2,733,361 | 1/1956 | Bessiere ..................... 310/93 |
| 2,818,516 | 12/1957 | Bessiere ..................... 310/93 |
| 2,842,690 | 7/1958 | Bessiere ..................... 310/93 |
| 3,263,783 | 8/1966 | Sutaruk ...................... 192/58 |
| 3,391,763 | 7/1968 | Severson . |
| 3,592,298 | 7/1971 | Troy et al. . |
| 3,732,953 | 5/1973 | Huet ...................... 188/218 XL |
| 4,745,317 | 5/1988 | Estaque ..................... 310/105 |
| 4,853,574 | 8/1989 | Estaque ..................... 310/93 |

Primary Examiner—Peter S. Wong
Assistant Examiner—D. L. Rebsch
Attorney, Agent, or Firm—Larson & Taylor

[57] ABSTRACT

For improving the cooling of the rotor armature disk (2) of an electromagnetic retarder, connected to an outer flange (10) by a circle of arms (9) forming ventilation fins, these arms are formed by two parallel dividing walls (12) defining a narrow elongate pocket (13) whose bottom is formed by the disk and which opens axially into the free face of the flange through a slit (14) formed in this flange.

20 Claims, 2 Drawing Sheets

ARMATURE ROTORS FOR ELECTROMAGNETIC RETARDERS

The invention relates to armature rotors for electromagnetic retarders, more especially for vehicles, which rotors comprise at least one disk made from a ferromagnetic material adapted for travelling past a stator ring of alternately positive and negative electromagnetic poles from which it is only separated by an air gap, this disk being then braked and heated because of the creation of eddy currents in its mass.

It concerns more particularly, among these rotors, those whose disk is connected to a fixing ring by a circle of arms, preferably bent and curved, forming ventilation fins, the largest diameter portions of these arms projecting from the face of the disk opposite the air gap and the peaks of these portions being connected together by an annular flange, the assembly formed by the disk, the ring, the arms and the flange being formed as a single molded block, generally made from steel.

The removal of the heat generated in the disk of such a rotor by the eddy currents, during use of the retarder equipped with this rotor, takes place essentially by conduction to the flange through the arms and by radiation from the disk, from the arms and from the flange, this latter phenomenon being greatly reinforced by ventilation: in fact, the fan profile adopted for the arms means that the rotor plays the role of fan by sweeping the hot surfaces to be cooled down of the disk, of the arms and of the flange with a current of cooling air.

With known embodiments of the rotors considered, said removal of heat generated in the disk is not quite satisfactory.

Thus the disk in question may become red hot, its temperature reaching or even exceeding a value of the order of 700° C., whereas the flange remains at a temperature less than 500° C..

Now, it is important to cool down the disk efficiently.

In fact, the retarding torque likely to be generated by the retarder equipped with this disk is reduced in considerable proportions when this disk is overheated.

Thus this torque may decrease from a value C to a value C/3, for given values of the rotational speed and of the electric power consumed, when the disk is heated from the ambient temperature to a temperature of the order of 700° C..

The aim of the invention is especially to improve the cooling of the disk during operation of the retarder and so to increase the value of the torque generated by this apparatus under heated conditions.

For this, the rotors of the kind in question are essentially characterized in that some at least some of the arm portions which connect the flange to the disk are split into two parallel dividing walls defining a narrow and elongate pocket whose bottom is formed by the disk and which issues axially in the free face of the flange through a slit formed in this flange.

In advantageous embodiments, recourse is further had to one and/or another of the following arrangements:
- the profile of the end wall of the pocket closest to the axis of the rotor is widened out and rounded so as to facilitate the access of the ventilation air to the bottom of this pocket, even in its zone the closest to the axis,
- the pocket further issues radially inside the rotor at its end the closest to the axis of this rotor,
- the pocket further issues radially outside of the rotor at its end the farthest from the axis of this rotor,
- the bottom of the pocket, formed by the disk, is pierced with at least one orifice causing this pocket to communicate with the air gap,
- some of the parallel dividing walls defining the pockets are thickened at the level of their bases contiguous with the disk, so as to increase the removal of heat from the disk by conduction,
- the average thickness of each of the two parallel dividing walls defining a pocket is of the same order of size as the thickness of the single arms adopted in the prior art for rotors of comparable dimensions,
- in a rotor according to the preceding paragraph, whose outer diameter is between 500 and 550 mm, the average thickness of each of the two parallel dividing walls defining the pockets is of the order of 6 mm.

The invention comprises, apart from these main arrangements, some other arrangements which are preferably used at the same time and which will be more explicitly discussed hereafter.

In what follows, a preferred embodiment of the invention will be described with reference to the accompanying drawings in a way which is of course in no wise limitative.

Figure 2:
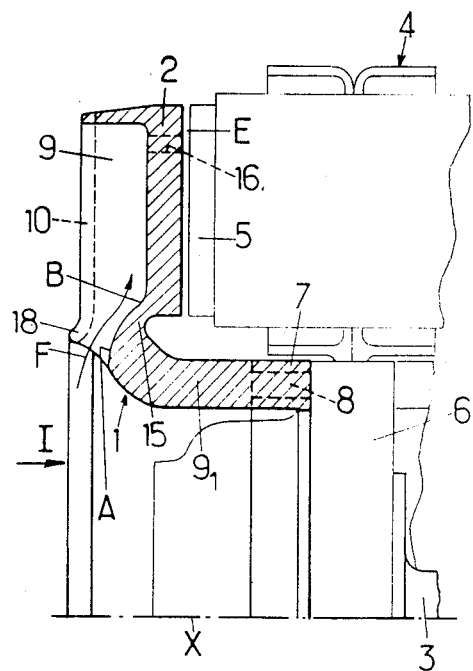

FIGS. 1 and 2 of these drawings show an electromagnetic retarder rotor constructed in accordance with the invention respectively in a half end view along the arrow I of FIG. 2 and in a half sectional view through II—II of FIG. 1, the corresponding stator being further shown partially in ghost outline in FIG. 2.

Figure 3:
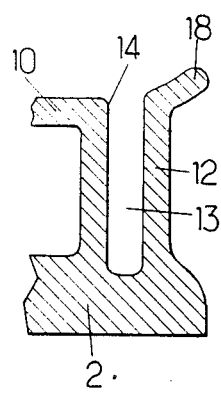
Figure 4:
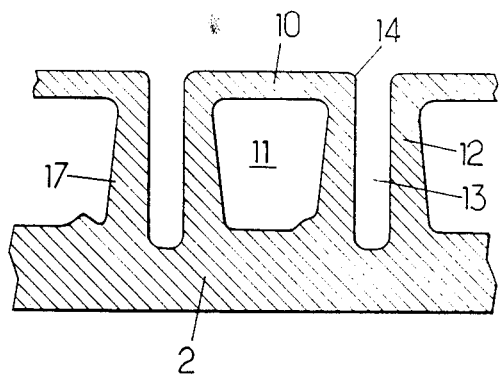

FIGS. 3 and 4 are partial sectional views of FIG. 1 through respectively III—III and IV—IV.

The word "rotor" used in the present text designates more precisely each of the one piece subassemblies 1 which are included in the rotor assembly with axis X of an electromagnetic or "eddy current" retarder and which comprise an armature disk made from a ferromagnetic material.

As is known, such a disk 2 is firmly secured to the shaft 3 to be slowed down, such as the transmission shaft of a vehicle, and it is mounted so as to be able to travel past the stator 4 of the retarder, or more precisely past a ring of alternately positive and negative inductor poles 5 forming part of the stator, with interpositioning of an air gap E, the disk 2 in question then being the seat of eddy currents which provide braking and cause heating of this disk.

The rotor assembly of the retarder comprises, in addition to the rotor or above defined subassembly, which is single or preferably split up symmetrically on each side of the stator, an intermediate piece 6 of revolution about the axis X, such as a sleeve, hub or plate, itself fixed, generally by bolting, to the shaft 3 to be slowed down, each "rotor" 1 here considered being for its part bolted to this intermediate piece.

In a way still known per se, each one piece rotor 1 comprises, in addition to the disk 2, molded integrally therewith:
- a fixing ring 7 of mean diameter less than the inner diameter of disk 2, pierced with axial bores 8, threaded or not, for receiving bolts (not shown) fixing this ring to the intermediate piece,
- a circle of ventilation fins 9 projecting from the face of disk 2 opposite its face intended to define the air gap E, some at least of these fins (more particularly one out of two or one out of three) being extended towards the axis X so as to form arms $9_1$ connecting the disk to the ring 7, and a rim or annular flange 10 extending generally parallel to the disk and connecting the peaks of the large diameter portions of the fins 9 so as to form between these fins, the disk and the flange guide channels 11 for the ventilation air.

Fins 9 and arms $9_1$ which possibly extend them are preferably curved rearwardly with respect to the direction of rotation of the rotor, if we consider the increasing radii.

Furthermore, arms $9_1$ are preferably axially bent, as in the embodiment illustrated, so as to "draw in" the ring 7 axially to the inside of the stator and thus to reduce the axial size of the central portion of the rotor.

But said arms 9 could also be "straight", their mean lines then remaining substantially continuous in the same transverse plane.

The number of arms $9_1$ of each rotor is advantageously equal to 8 and the total number of its fins 9 to 16.

It is the removal of the heat generated in disk 2 by the creation of the eddy currents during use of the retarder that the present invention proposes improving.

For this, some at least of fins 9 are formed by pairs of parallel dividing walls 12 defining therebetween a narrow and elongate pocket 13 whose bottom is defined by disk 2 and which emerges axially on the free face of flange 10 through a slit 14 formed in this flange.

Experience shows that, unexpectedly, such a construction with hollow or divided fins emerging in the flange provide much more efficient cooling than known constructions of the same kind comprising simple solid fins.

This is due to the automatic creation of an intense sweeping effect of the inner surfaces of the pocket by currents of ventilation air, during rotation of the rotor.

The intensity of such sweeping is surprising because the free face, generally flat or of a truncated cone shape, of flange 10 is smooth and so does not have projections likely to "catch" the air during said rotation.

This improvement in the cooling results in an increase in the retarding torque, all other things being equal, and this without for all that causing appreciable losses through ventilation, i.e. without leading to a substantial increase of the torque required for driving the retarder when cold.

Thus, in an effective embodiment, with the above defined improvement the deceleration torque of a "hot" retarder, which remained after 20 minutes of permanent operation, was improved by more than 20%, whereas the low torque required for driving this retarder when cold is only increased by a third at most: by way of comparison, the structural modifications of the rotor which are usually proposed for improving the cooling of this rotor to the point of increasing the torque when hot by about 20% results in doubling or tripling the drive torque when cold.

The narrow elongate pockets 13 may be closed at both their radial ends.

This is what has been assumed in FIGS. 1 and 2.

In this case, it is advantageous to widen out at A (FIG. 2) the edge of wall 15 defining the internal radial end of the pocket and to round off the base of the surface, of this wall 15, inside the pocket, at the level of its connection B with the bottom of this pocket, i.e. with disk 2.

Such widening out A and rounding off B allow the sweeping air currents to reach as far as the bottom of the pocket even in its upstream zone, as shown schematically by arrow F in FIG. 2, without creating any unswept dead volume in this zone.

The pocket may also be opened completely at one and/or at the other of its two radial ends so as to cause this pocket to emerge not only axially in the free face of flange 10, but also radially towards the inside and/or towards the outside of the rotor ring.

In such a case, the ends of the two dividing walls 12 defining the same pocket 13 may be stopped, close to one and/or the other of its radial openings, at the same level, that is to say facing each other in the direction perpendicular to their mean surfaces at the end considered, or on the contrary any one of these two dividing walls 12 may be extended radially with respect to the other.

In this latter case, arms $9_1$ may be formed by internal extensions of one only of the two dividing walls 12 of the pocket concerned.

The fact of opening the pocket inwardly of the rotor offers the advantages of improving the sweeping of the bottom of this pocket, reducing the drive torque for the retarder when cold and lightening the rotor.

In another variant, the bottom of the pocket 13 is formed, through the armature disk 2 itself, with at least one orifice 16 of appropriate section and profile causing the inside of the pocket to communicate with the air gap E.

Such orifices 16 may serve either for taking from the air gap the hot air to be cooled, or sending cooling air into this air gap.

As for the thickness e of the parallel dividing walls 12, it is provided relatively high so that the heat removed by conduction from disk 2 is itself sufficient for justifying the adoption of the improvement of the invention, the aim of which improvement is to remove the heat stored in the divided fins by ventilation.

Thus this thickness e of each dividing wall 12 may be of the same order of size as the thickness of the single fins which, in prior known constructions, fulfills the role of the split dividing walls considered here.

This thickness is advantageously of the order of 5 to 8 mm for a rotor with 16 fins whose outer diameter is between 500 and 550 mm.

For further improving the removal by conduction of the heat generated in disk 2, it may be advantageous to increase the thickness of dividing walls 12 at the level of their bases adjacent this disk.

This is what has been shown at 17 in FIGS. 1 and 4, the cross sections of the dividing walls 12 then having the general shape of a trapezium.

In the embodiment illustrated, the large base of this trapezium, contiguous with disk 2, is all the wider, the further away from the axis X of the rotor, which corresponds to increasing amounts of heat to be removed, the amount of heat to be removed from each ring Of given radial thickness of disk 2 increasing with the mean radius of this ring.

To facilitate the introduction of ventilation air currents inside channels 11, the inner edge of flange 10 is slightly widened at 18 (FIGS. 2 and 3).

Following which and whatever the embodiment adopted, an electromagnetic retarder armature rotor is finally obtained whose construction, operation and advantages (particularly the improvement of cooling and consequently the increase in the deceleration torque when hot) follow sufficiently from what has gone before.

As is evident, and as it follows moreover already from what has gone before, the invention is in no wise limited to those of its modes of application and embodiments which have been more especially considered; it embraces, on the contrary, all variants thereof.

I claim:

1. An electromagnetic retarder armature rotor having a fixing ring comprising:
    at least one disk;
    an annular flange having a plurality of slits extending in the axial direction therethrough;
    a plurality of arms extending in the radial direction forming ventilation fins and arranged about said disk, said arms connecting said disks to the fixing ring, each arm including a base portion which projects axially from said disk, a mid portion and a peak portion, said arm base portion, having the largest diameter of the portions of said arm, and all of said arm peak portions being joined together by said flange;
    wherein, for at least some of said arms, the arm portion that connects said flange to said disk is composed of two spaced apart dividing walls, said walls defining an elongate pocket, the bottom of which is formed by said disk; and the top of which is in axial communication with a corresponding one of said flange slits.

2. The rotor as claimed in claim 1 wherein the fixing ring and said disk, flange and arms are connected so as to form an integral assembly.

3. The rotor as claimed in claim 10 wherein the fixing ring and said disk, flange and arms are formed as a single molded block.

4. The rotor as claimed in claim 1 wherein said dividing walls extend substantially parallel to each other; and wherein said elongate pocket is narrow.

5. The rotor as claimed in claim 1 wherein said flange slit has a shape and has dimensions in the plane of said flange corresponding to said pocket such that said pocket opens axially in the free face of said flange through said slit.

6. The rotor as claimed in claim 1 wherein said pocket has an end wall at the end thereof nearest to the axis of the rotor, said end wall being widened and rounded so as to facilitate the access of ventilation air to said pocket bottom and even to that pocket volume closest to the rotor axis.

7. The rotor as claimed in claim 1 wherein said pocket has an opening radially outwardly of the rotor at the pocket end closest to the axis of the rotor.

8. The rotor as claimed in claim 11 wherein said pocket has an opening radially outwardly of the rotor at the pocket end furthest away from the axis of the rotors.

9. The rotor as claimed in claim 1 wherein when such rotor is rotatably mounted in a stator, there is an air gap between said disk and the stator; and
    wherein said pocket bottom, formed by said disk, is provided with at least one orifice completely through said disk such that said pocket is in communication with the air gap.

10. The rotor as claimed in claim 1 wherein at least some of said pocket dividing walls are thickened at said base portions so as to increase the removal of heat coming from said disk by convection.

11. The rotor as claimed in claim 1 wherein the mean outer diameter of the rotor is from 500 mm to 550 mm; and
    wherein the mean thickness of each of said two dividing walls is of the order of 6 mm.

12. The rotor as claimed in claim 3 wherein said dividing walls extend substantially parallel to each other; and wherein said elongate pocket is narrow; and
    wherein said flange slit has a shape and has dimensions in the plane of said flange corresponding to said pocket such that said pocket emerges axially in the free face of said flange through said slit.

13. The rotor as claimed in claim 2 wherein said pocket has an end wall at the end thereof nearest to the axis of the rotor, said end wall being widened and rounded so as to facilitate the access of ventilation air to said pocket bottom and even to that pocket volume closest to the rotor axis.

14. The rotor as claimed in claim 13 wherein when such rotor is rotatably mounted in a stator, there is an air gap between said disk and the stator; and
    wherein said pocket bottom, formed by said disk, is provided with at least one orifice completely through said disk such that said pocket is in communication with the air gap.

15. The rotor as claimed in claim 14 wherein at least some of said pocket dividing walls are thickened at the base portions thereof which are contiguous with said disk so as to increase the removal of heat coming from said disk by convection.

16. The rotor as claimed in claim 13 wherein at least some of said pocket dividing walls are thickened at said base portions so as to increase the removal of heat coming from said disk by convection.

17. An armature rotor used in an electromagnetic retarder that also includes a stator having a stator ring of electromagnetic poles, said rotor comprising:
    a shaft having a fixing ring rigidly mounted thereon;
    at least one disk;
    an annular flange having a plurality of slits therethrough;
    a plurality of arms extending in the radial direction forming ventilation fins and arranged about said disk, said arms having mounting portions connecting said disk to said fixing ring and each arm also including a base portion which projects axially from said disk, a mid portion, and a peak portion which is connected to and mounts said flange coaxially to said disk;
    wherein for at least come of said arms, the arm portion that connects said flange to said disk is composed of two narrowly spaced apart dividing walls, said walls defining an elongate, radially extending pocket, the bottom of which is formed by said disk and the top of which is contiguous with a corresponding one of said flange slits; and
    wherein one face of said disk is mounted abuting, but spaced from, the stator ring so as to form a gap, and wherein said disk and flange are mounted on said shaft such that the face of said annular flange facing outwards from said disk is also mounted axially with respect to said stator.

18. The rotor as claimed in claim 17 wherein said pocket has an end wall at the end thereof nearest to the axis of the rotor, said end wall being widened and rounded so as to facilitate the access of ventilation air to said pocket bottom and even to that pocket volume closest to the rotor axis.

19. The rotor as claimed in claim 17 wherein said pocket bottom, formed by said disk, is provided with at least one orifice completely through said disk such that said pocket is in communication with the air gap.

20. The rotor as claimed in claim 17 wherein at least some of said pocket dividing walls are thickened at said base portions so as to increase the removal of heat coming from said disk by convection.

* * * * *